(12) United States Patent
Wiley et al.

(10) Patent No.: US 11,754,108 B2
(45) Date of Patent: *Sep. 12, 2023

(54) SNAP NUT CONCRETE ANCHOR ASSEMBLY

(71) Applicant: Black & Decker Inc., New Britain, CT (US)

(72) Inventors: Jessica Wiley, Halethorpe, MD (US); Yanchao Wang, Towson, MD (US); Matthew Chamberlain, Bethel, CT (US); Jack Dunning, White Plains, NY (US); John Horky, Lutherville, MD (US)

(73) Assignee: BLACK & DECKER INC., New Britain, CT (US)

( * ) Notice: Subject to any disclaimer, the term of this patent is extended or adjusted under 35 U.S.C. 154(b) by 140 days.

This patent is subject to a terminal disclaimer.

(21) Appl. No.: 17/173,321

(22) Filed: Feb. 11, 2021

(65) Prior Publication Data
US 2021/0164509 A1 Jun. 3, 2021

Related U.S. Application Data

(63) Continuation of application No. 15/923,052, filed on Mar. 16, 2018, now Pat. No. 10,927,874.

(51) Int. Cl.
*F16B 39/36* (2006.01)
*F16B 13/12* (2006.01)
*F16B 37/08* (2006.01)

(52) U.S. Cl.
CPC ........ *F16B 13/124* (2013.01); *F16B 37/0857* (2013.01)

(58) Field of Classification Search
CPC ... F16B 13/124; F16B 37/0857; F16B 13/128
(Continued)

(56) References Cited

U.S. PATENT DOCUMENTS 2,489,613 A 11/1949 Robert
2,814,324 A 11/1957 Shur
(Continued)

FOREIGN PATENT DOCUMENTS

EP 3225859 A 10/2017

OTHER PUBLICATIONS

European Search Report dated Jul. 28, 2022 cited in corresponding European Patent Application No. 22173695.2.

*Primary Examiner* — Gary W Estremsky
(74) *Attorney, Agent, or Firm* — Kofi A. Schulterbrandt

(57) ABSTRACT

The present disclosure describes an anchor device for receiving and securing a shaft thereto. The device includes an outer housing within which a jaw assembly is secured. The outer housing of the device may in turn be secured to or within a support structure such as a building component. Jaw components of the jaw assembly may be threaded. Furthermore, the jaw assembly has at least two configurations. In a first configuration, at least one jaw component is positioned away from a central shaft axis against the biasing force of a biasing member. A removable or reconfigurable holding member or stop member selectively secures the at least one jaw component in this position. A second configuration is the result of the holding member being reconfigured by the inserted shaft. The shaft triggers movement of the at least one jaw component toward the central shaft axis and into contact with the shaft.

14 Claims, 8 Drawing Sheets

(58) Field of Classification Search
USPC .................................................. 411/270, 433
See application file for complete search history.

(56) References Cited

U.S. PATENT DOCUMENTS

| | | | |
|---|---|---|---|
| 3,157,215 A | | 11/1964 | Zahodiakin |
| 4,368,606 A | * | 1/1983 | Hoshino ............... E04B 1/4128 |
| | | | 52/709 |
| 5,106,251 A | | 4/1992 | Steinbach |
| 5,118,237 A | * | 6/1992 | Wright ................ F16B 37/0864 |
| | | | 411/14 |
| 5,139,381 A | | 8/1992 | Lubreski et al. |
| 5,282,709 A | | 2/1994 | Chaput et al. |
| 5,378,100 A | | 1/1995 | Fullerton |
| 5,613,816 A | | 3/1997 | Cabahug |
| 5,749,691 A | * | 5/1998 | Campbell ........... F16B 37/0864 |
| | | | 411/270 |
| 5,800,108 A | * | 9/1998 | Cabahug ............. F16B 37/0857 |
| | | | 411/433 |
| 5,988,965 A | | 11/1999 | Fiorell et al. |
| 6,478,334 B1 | * | 11/2002 | Desmarais ............ B60R 22/201 |
| | | | 280/805 |
| 7,416,375 B2 | | 8/2008 | Virdee |
| 8,950,292 B2 | * | 2/2015 | Declerck ............... B23P 19/067 |
| | | | 81/10 |
| 2004/0004329 A1 | | 1/2004 | Schroeder |
| 2007/0057563 A1 | | 3/2007 | Taguchi et al. |
| 2010/0129178 A1 | | 5/2010 | Smith |
| 2010/0166525 A1 | | 7/2010 | Dvorak |
| 2018/0298938 A1 | | 10/2018 | Drose et al. |
| 2019/0264720 A1 | * | 8/2019 | Miller .................... F16B 5/0642 |

\* cited by examiner

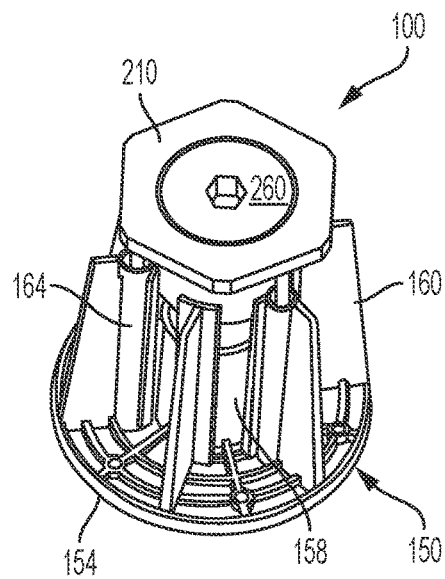
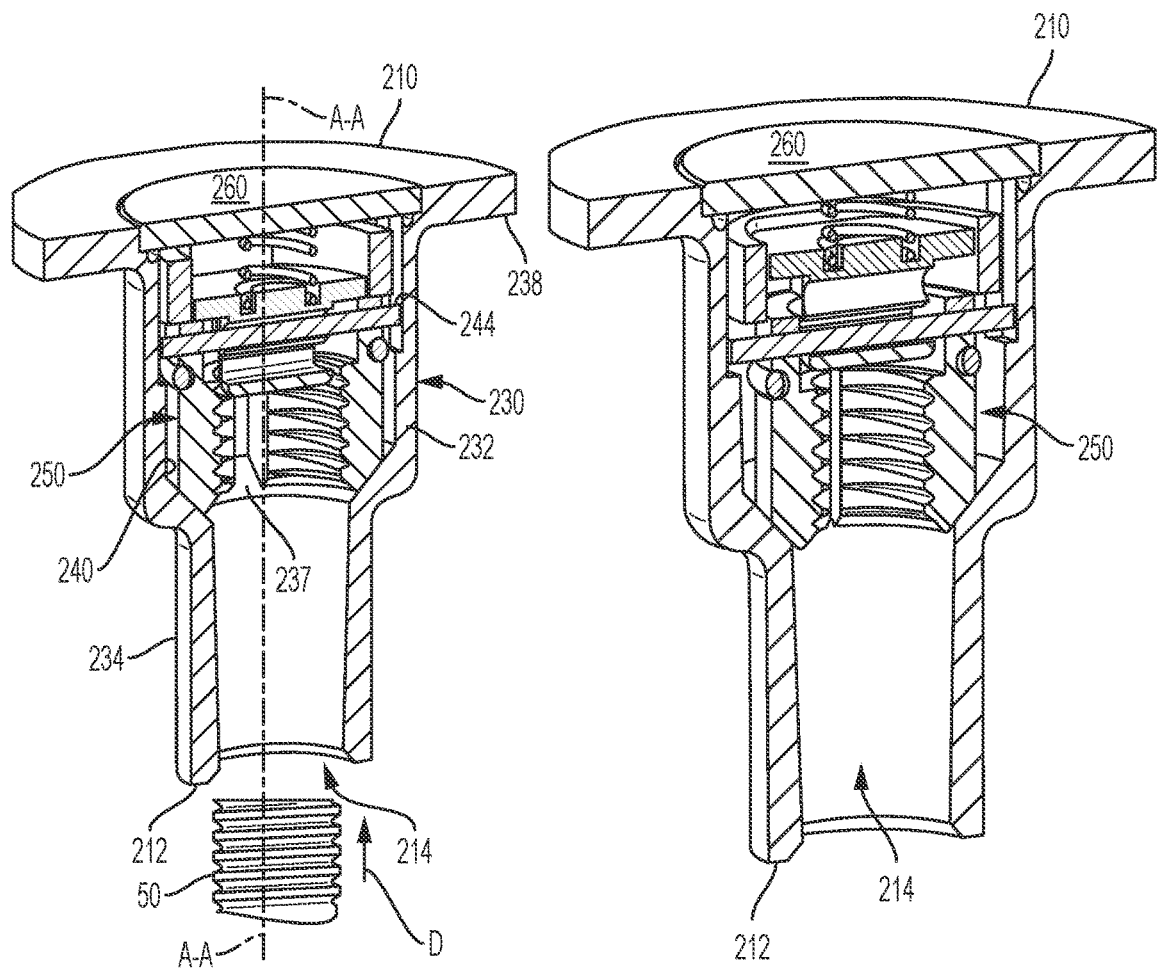
FIG. 1A
FIG. 1B   FIG. 1C

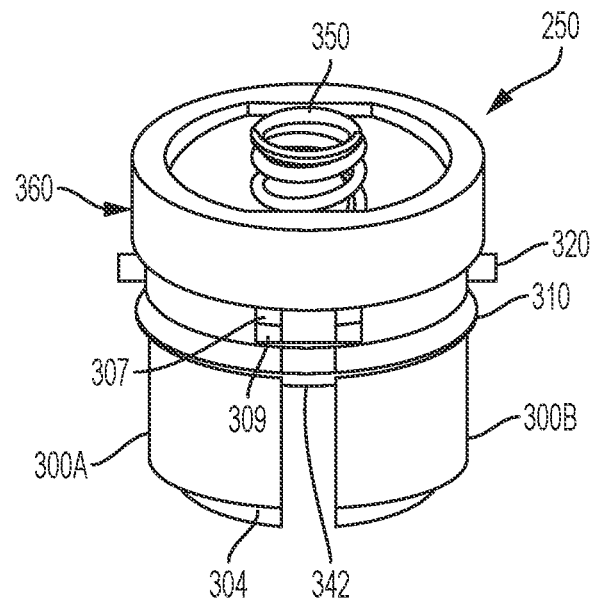
FIG. 2A
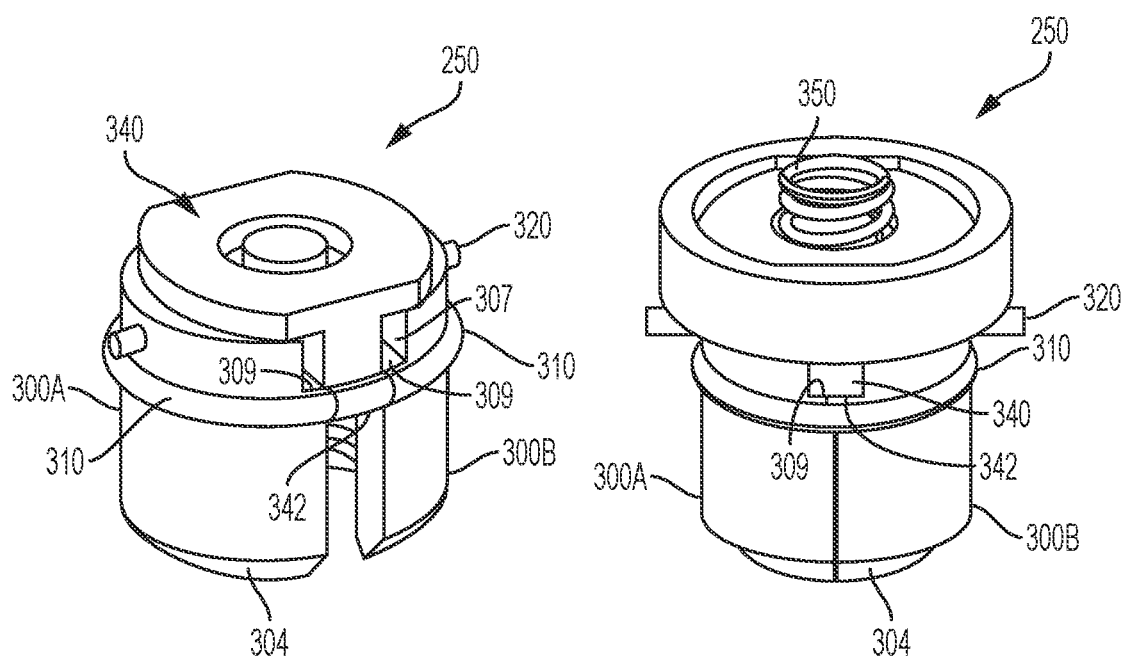
FIG. 2B
FIG. 2C

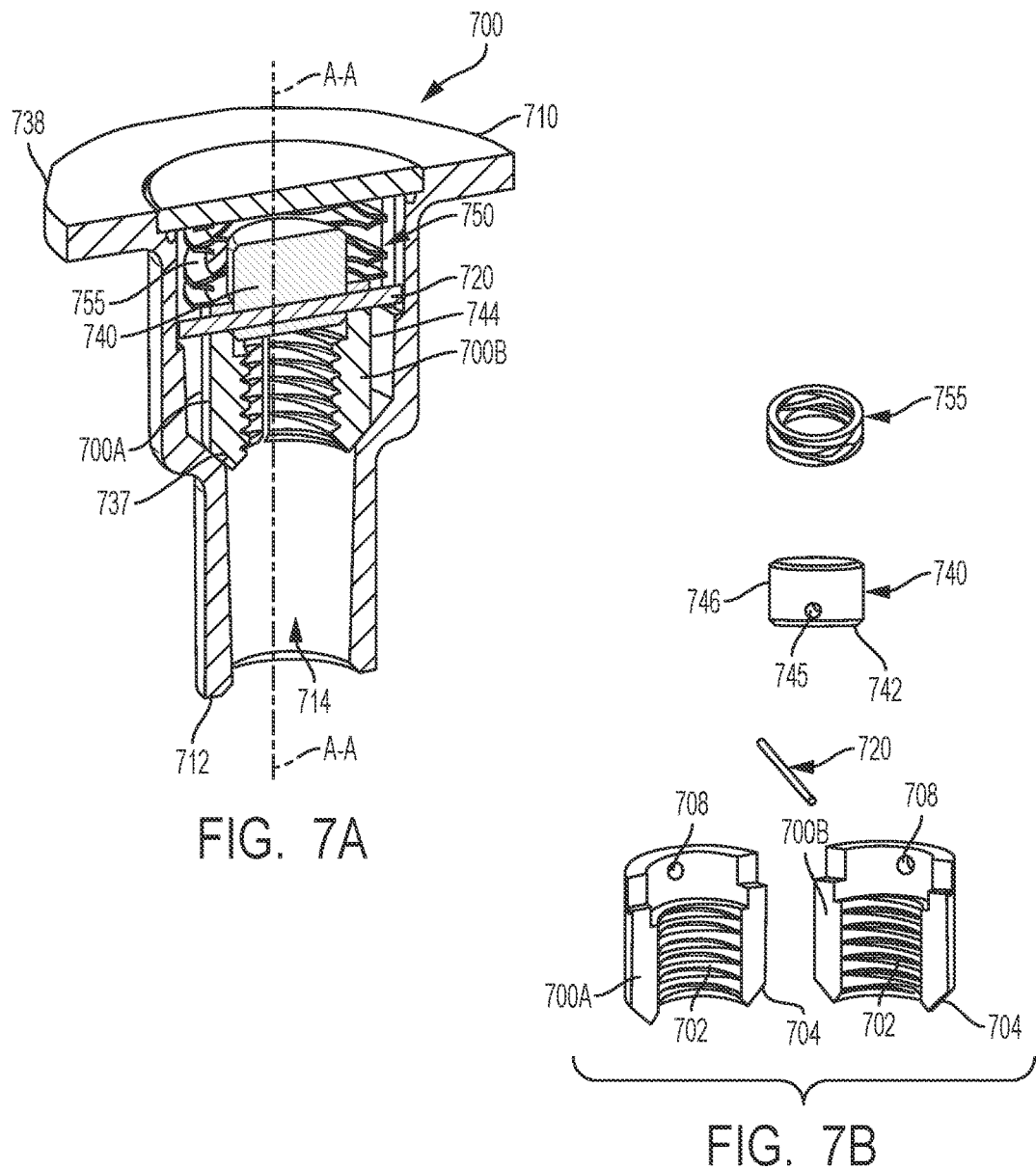
FIG. 7A
FIG. 7B
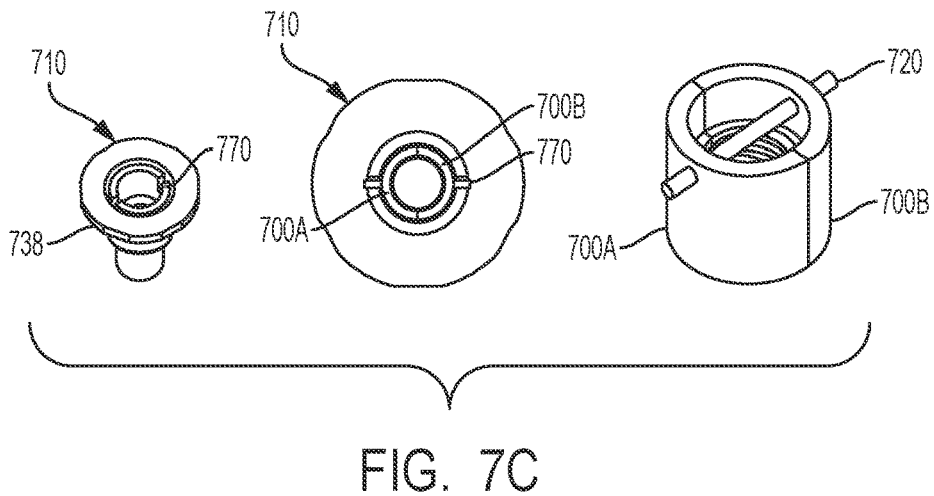
FIG. 7C

SNAP NUT CONCRETE ANCHOR ASSEMBLY

CROSS-REFERENCE TO RELATED APPLICATIONS

This is a continuation application of U.S. non-provisional application Ser. No. 15/923,052 filed Mar. 16, 2018 and the disclosure of which is incorporated herein by reference in its entirety.

BACKGROUND OF THE INVENTION

The present invention relates to anchors for use in concrete substrates. However, the general concept disclosed herein could be used in any application in which a threaded male shaft is to be secured in a threaded female receptacle to another the shaft or the receptacle.

Concrete structures are typically formed from concrete substrates, being either the type made off site (commonly known as pre-cast concrete substrates) or the type made on site (commonly known as cast in place (CIP) concrete substrates). Both types of concrete substrates may be reinforced with metal of other suitable materials depending on their intended application. It is often necessary to attach fixtures and fittings to concrete substrates, the nature of which might vary according to the type of structure. For instance, many buildings have floors or walls made from concrete panels from which ducts or other items may be suspended, bridges may include concrete portions from which signage and other items must be hung, and so on. This often requires an anchor to be secured to or within the concrete substrate such that the fixtures and fittings can be mechanically fastened to the anchor. The anchors of interest here are those which are installed during production of the substrate, rather than those retrofitted to the concrete substrate after production. The general process for installing these anchors includes the steps of setting out a form board, mounting the anchor in the desired position on the form board, securing the anchor to the form board, pouring concrete over the form board and the anchor, removing the form board from the set concrete so as to reveal at least a portion of the anchor adjacent the now removed form board. The revealed portion of the anchor may expose a receptacle into which a threaded rod may be received and secured. In other words, these anchors comprise an anchor point accessible from the underside of the concrete substrate and which typically take the form of a threaded bore into which a bolt or threaded shaft can be fastened.

Because different structural designs may require different diameter bolts or threaded shafts, numerous anchor designs have been proposed such that a single threaded bore anchor structure mentioned above is able to accommodate different sized/diameter bolts or threaded rods. Typically, such threaded bore structures embody some sort of separable split nut concept in which a threaded bore includes at least two separable threaded parts or portions. The parts are able to be forced apart radially from a central longitudinal axis of the rod or bolt and then are biased back together so that interior female threads of the bore portions complementarily engage the external male threads of the rod or bolt. Many of these designs allow a rod or bolt to be installed by simply forcing the rod or bolt axially into the bore portions spreading the bore portions apart and then allowing the bore portions to be axially biased radially back inward (e.g., by a flexible biasing member) onto the rod or bolt.

At least U.S. Pat. Nos. 4,368,606 and 5,468,105 teach the biased split nut concept embodied in an anchor that is attachable to formwork (e.g., wooden formwork). U.S. Pat. No. 4,007,563 discloses an anchor for setting in metal decking. The present application also contemplates replacement of the female thread receptacle disclosed therein with the snap locking system described below. All three patents are incorporated by reference herein in their entirety.

While split nut designs provide a certain flexibility with axial installation and even accommodation of multiple thread sizes, this structure can also present some reliability challenges. Specifically, mating between the threads of the rod and nut portions is important, so it is best when the alignment of the separate bore portions is maintained and it would be preferred if the user could have assurances that proper alignment of the portions and complete collapse of portions onto the rod or bolt has occurred. Furthermore, assurances that a user has inserted a rod or bolt a sufficient distance into the anchor is beneficial.

It is therefore an object of the present invention to provide an anchor which is easy to install and whose integrity is not affected by careless installation.

SUMMARY OF THE INVENTION

According to a first aspect of the invention, there is provided a base member connectable to a support member to form an anchor assembly mountable to a form board or metal decking on which wet concrete may be poured during formation of a concrete substrate, the base member includes a mounting portion for mounting the anchor assembly to the form board. The base member may also include a main guide having first and second generally opposed ends, the first end being open to facilitate insertion of the support member into the main guide. The main guide may also including a generally tubular body upstanding from the mounting portion. The tubular body may have an internal cross-section sized and shaped to correspond closely with the cross-section of the support member so as to create a snug fit between the main guide and the support member.

Advantageously the base member includes at least one reinforcement member to improve the rigidity and or strength of the main guide. The reinforcement member may comprise at least one web arranged between the main guide and the mounting portion and preferably spaced equidistantly around the main guide.

One type of reinforcement member may include at least one rib arranged axially and projecting inwardly. The at least one rib may add increased stiffness and lateral support between the main guide and the support member to resist inadvertent deformation and/or disassembly of those parts. The plurality of ribs circumferentially spaced around the main guide and each disposed between two neighboring channels.

According to a second aspect of the invention, there is provided a cast in place anchor assembly comprising a base member as described above and a support member located in the main guide of the base member. The support member may include attachment means accessible through the second end of the main guide. For instance, the support member may comprise a shank having opposed first and second ends.

Specifically, the support member includes an outer housing, the outer housing being defined by a longitudinal axis, the outer housing including a wall, the outer housing also including a connector opening at a first end thereof for receiving the threaded shaft/shank, the outer housing further including an assembly opening at a second end opposite the first end thereof, the housing wall including an inner surface defining a inner space.

The support member further includes a jaw assembly disposed in the inner space, the jaw assembly including at least one threaded jaw the threads of which selectively engage threads of the shaft, the jaw assembly further including a bias member for biasing the at least one thread jaw toward the longitudinal axis. A holding member is provided that prevents the bias member from moving the at least one threaded jaw toward the longitudinal axis.

The jaw assembly may take two different configurations. In a first jaw assembly configuration, the holding member prevents the at least one threaded jaw from moving toward the central longitudinal axis. Furthermore, in the first configuration the threaded shaft is inserted into the connector opening, to contact the holding member to release the at least one threaded jaw to move toward the central longitudinal axis and into biased contact with the threaded shaft to define a second jaw assembly configuration.

DRAWINGS

By way of example only, embodiments of the present invention will now be described in detail, with reference being made to the accompanying drawings, in which:

FIG. 1A is a first perspective view of an anchor assembly of the present invention;

FIG. 1B is a side perspective cutaway view of the anchor assembly of FIG. 1 in a pre-snap configuration receiving a threaded shaft;

FIG. 1C is a side perspective cutaway view of the anchor assembly of FIG. 1 in a post-snap configuration;

FIG. 2A is top perspective view of the jaw assembly of FIG. 1B in a first pre-snap configuration;

FIG. 2B is top perspective view of the jaw assembly of FIG. 1B in a first pre-snap configuration with the resilient member and upper guide removed;

FIG. 2C is top perspective view of the jaw assembly of FIG. 1B in a second post-snap configuration;

FIG. 7A is a side perspective cutaway view of a second embodiment of the present invention;

FIG. 7B is an exploded view of the jaw assembly of FIG. 7A of the present invention.

FIG. 7C are top views and top perspective views of the support member of FIG. 1B including a portion of the jaw assembly of FIG. 1B.

DETAILED DESCRIPTION OF THE PREFERRED EMBODIMENT

Figure 1D:
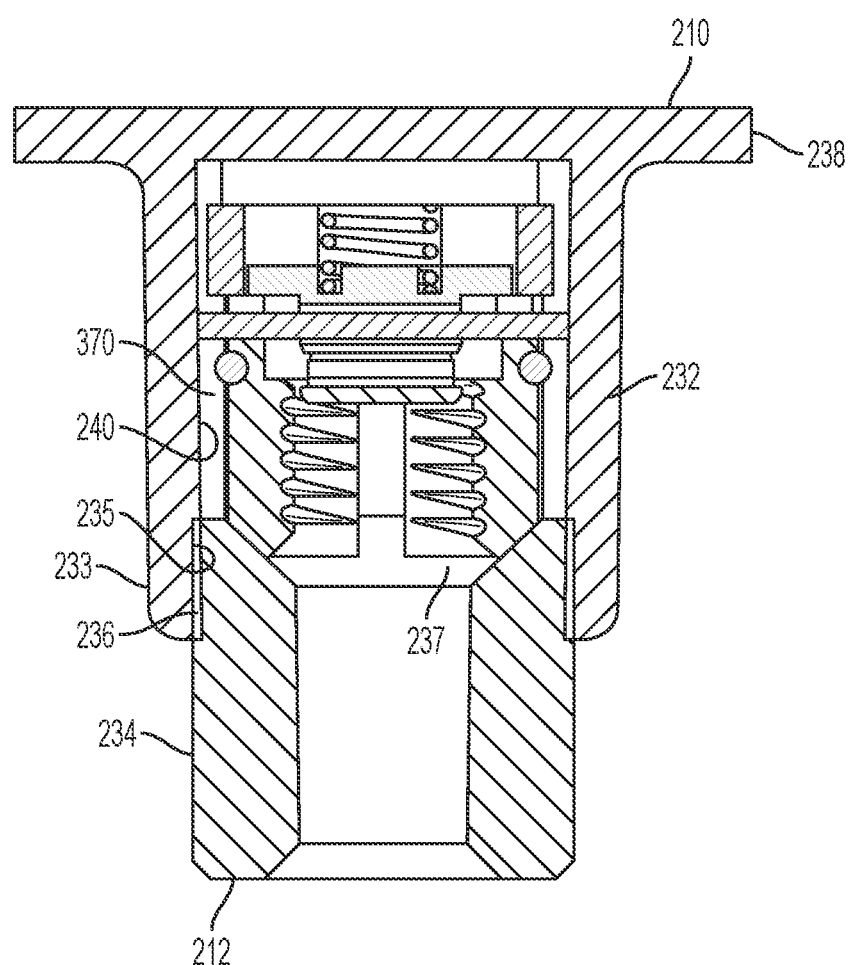
FIG. 1D is a side cross-sectional view of the anchor assembly of FIG. 1 in a pre-snap configuration with a separable support member.

FIGS. 1A and 1B show an embodiment of an anchor assembly of the present invention, which is generally indicated as 100. Anchor assembly 100 includes a support member 210 to be supported within a base member 150.

FIG. 1B shows a threaded shaft 50 which may be inserted into anchor assembly 100 in a direction D. Base member 150 may be mounted to a form board (not shown) for defining a perimeter of a poured concrete structure. Base member 150 may include a form engagement support 154 and a raised main guide 158 for receiving and positioning support member 210 relative to the form after assembly. Raised main guide 158 may be further reinforced by ribs or structural aids 160 that hold raised main guide 158 securely relative to base member 150. Structural aids may come in various forms and may include channels 164 through which fasteners (e.g., nails) pass and then enter the form for securing anchor assembly 100 to the form. Also shown in FIGS. 1A and 1B is a plug or cover 260 to be discussed in more detail below.

FIGS. 1B-1D show perspectives cross-sectional view of the support member 210 of FIG. 1A. FIG. 1B has an axis A-A. Support member 210 includes an outer housing 230 and a jaw assembly 250. Outer housing 230 includes side walls 232 and a flange 238 which extends radially outward from side wall 232. An underside of flange 238 provides a bearing surface for resisting pull out of support member 210 from the concrete. Plug 260 may serve as a cover that locks (e.g., threadably) into flange 238 for access to an interior of support member 210. Side wall 232 includes and inner surface 240 that defines an inner space 244. FIG. 1D shows how side wall 232 may also include upper and lower portions 233 and 234 respectively. Furthermore, upper portion 233 and lower portion 234 may connect at respective female and male threads 235 and 236. Inner surface 240 may also include an incline surface portion 237 that narrows in diameter toward an insertion end 212 of support member 210.

Figure 3:
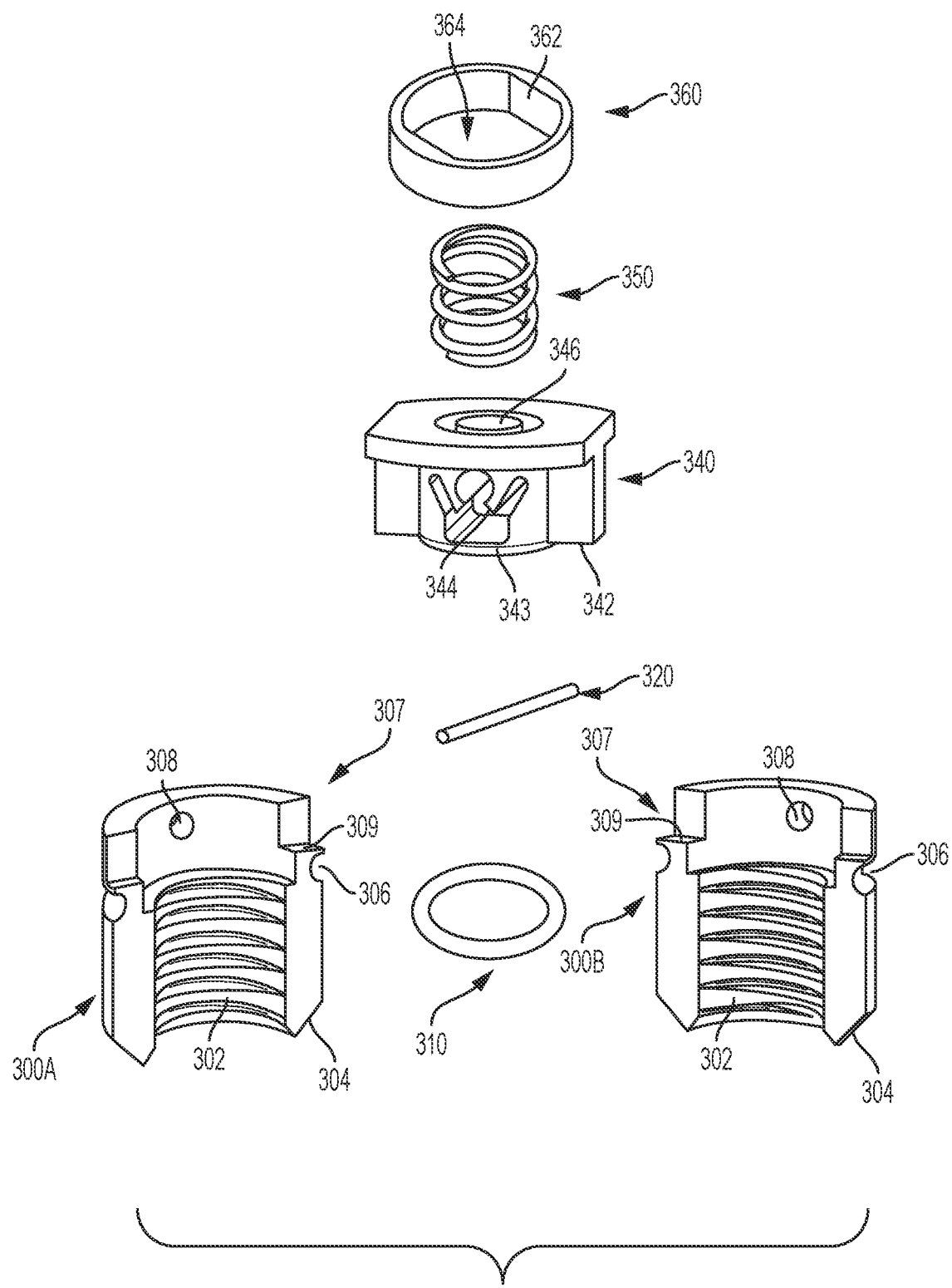
FIG. 3 is an exploded perspective view of the individual elements of the jaw assembly of FIG. 1B.

When assembled, jaw assembly 250 is located within inner space 244 as shown in FIGS. 1B & 1C. FIGS. 2A-2C show jaw assembly 250 assembled outside of support member 210. In addition, FIG. 3 shows individual elements of Jaw assembly 250 in perspective. Jaw assembly 250 includes a first jaw 300A and second jaw 300B. Each of jaws 300A and 300B include interior threads 302, inclined surfaces 304, biasing notches 306 and alignment holes 308. Jaws 300A and 300B are assembled into a generally cylindrical arrangement as shown in FIGS. 2A-2C. A resilient bias member 310 surrounds jaws 300A, 300B and bias jaws 300A, 300B toward central axis A-A. Openings 308 simultaneously receive an alignment pin 320. Alignment pin 320 links jaws 300A, 300B to limit the relative movement (e.g., relative axial movement) between jaw 300A and jaw 300B during operation.

Jaw assembly 250 also includes a holding member 340. Holding member 340 can assume at least two positions within jaw assembly 250 (discussed in further detail below). Holding member 340 includes a bottom surface 342, lower members 343, resilient legs 344, and a spring guide 346. Lower member 343 of holding member 340 extends at a bottom of holding member 340 to surround or trap pin 320 within holding member 340. A resilient member 350 is disposed in inner space 244 between cover 260 of outer housing 230 and holding member 340 to bias holding member 340 downward toward and against or around alignment pin 320. An upper guide 360 is also disposed in inner space 244 between outer housing 230 and holding members 340. Upper guide 360 includes an inner wall 362 that defines an opening 364. Opening 364 serves as a means of accommodating and confining or guiding resilient member 350 radially such that inner wall 362 restricts radial movement of holding member 340. In turn spring guide 346 of holding member 340 confines resilient member 350 to axial movement.

Figure 4:
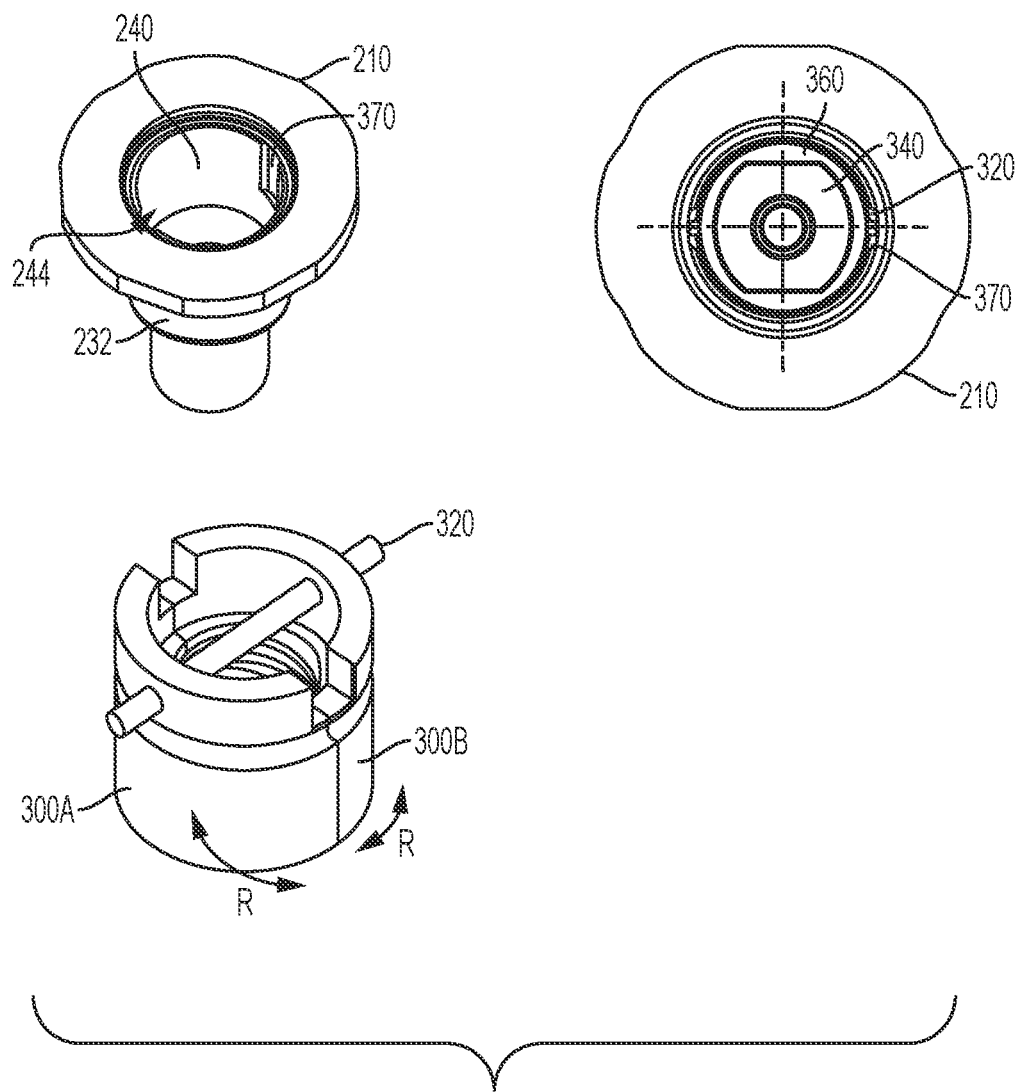
FIG. 4 are top views and top perspective views of the support member of FIG. 1B including a portion of the jaw assembly of FIG. 1B.

FIG. 4 shows an anti-rotational feature of the present invention. Specifically, FIG. 4A shows a perspective view of jaws 300A and 300B assembled together with alignment pin 320 passing through alignment holes 308. Alignment pin 320 extends past a radial extent of jaws 300A and 300B. Side wall 232 includes an axially extending slots 370. During assembly, a portion of jaw assembly 250 is inserted into inner space 244. As this insertion occurs cantilevered portions of alignment pin 320 extend into slots 370 so that alignment pin 320 cannot rotate relative support member 210. Since jaws 300A and 300B are also unable to rotate relative to alignment pin 320, jaws 300A, 300B are also unable to rotate relative to support member 210. Alignment pin 320 therefore limits and/or resists relative axial misalignment of jaws 300A and 300B as well as limits and/or resists rotation (R, see FIG. 4) of jaws 300A, 300B relative to support member 210 in a plane through pin 320 and through central longitudinal axis A-A or about an axis perpendicular to both A-A and a longitudinal axis of alignment pin 320. Said another way, alignment pin 320 limits rotational R misalignment of jaws 300A, 300B relative to central axis A-A. Such limits allow rotation, but maintain jaws 300A, 300B generally symmetrical relative to central axis A-A.

Figure 5A:
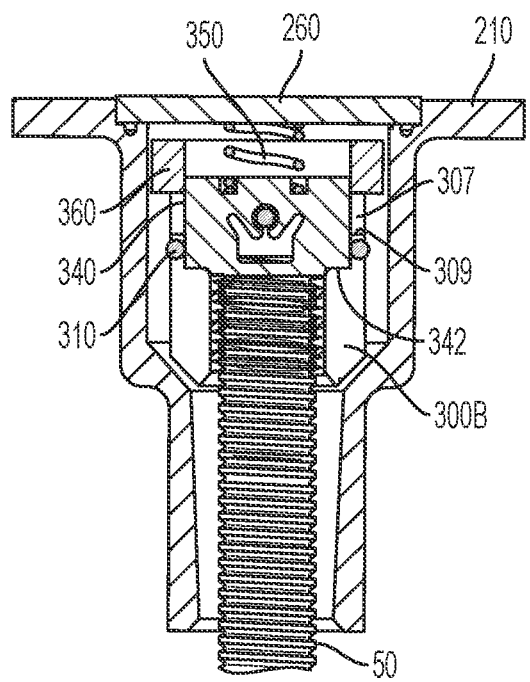
FIGS. 5A and 5B are side cross-sectional views of the support member of FIG. 1B in the pre-snap configuration.
Figure 5B:
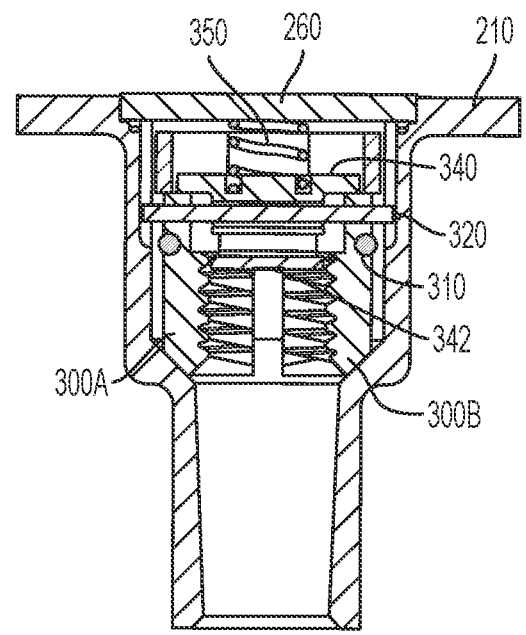
Figure 6A:
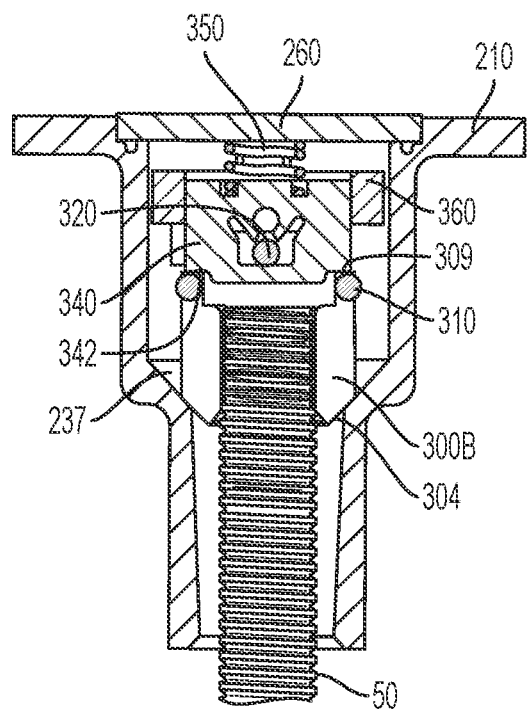
FIGS. 6A and 6B are side cross-sectional views of the support member of FIG. 1B in the post-snap configuration.
Figure 6B:
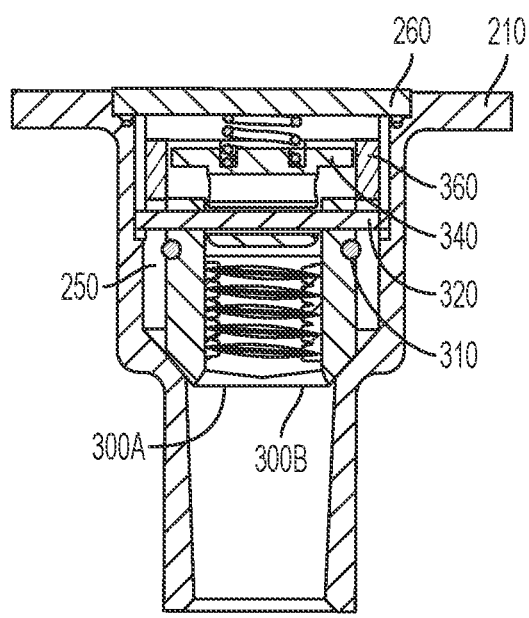

FIGS. 1B, 1D, 2A, 2B, 5A and 5B each show jaw assembly 250 in a first pre-snap configuration. On the other hand, FIGS. 1C, 2C, 6A, and 6B each show jaw assembly 250 in a second post-snap configuration. FIGS. 5A and 5B show jaw assembly 250 in the pre-snap configuration with a bottom 342 of holding member 340 still positioned below a bottom surface 309 of slot 307. FIGS. 6A and 6B show jaw assembly 250 in the post-snap configuration with a bottom 342 of holding member 340 above or clearing a bottom surface 309 of slot 307.

The operation of jaw assembly 250 in support member 210 will now be described with reference to the Figures. As mentioned above, jaw assembly 250 can take two configurations. In operation, a user desires to secure a threaded rod 50 to and in a jaw assembly 250 disposed in a support member 210 that has been encased in cured concrete. For example, support member 210 is secured in a ceiling slab so that an end 212 of holding member 210 is at a lower edge of the ceiling slab exposing access opening 214. A user may then, for example, look up from a lower floor, extend the threaded rod 50 into access opening 214, and secure the rod to jaw assembly 250 in the following manner.

Referring to FIGS. 1B, 1D, 2B, 2C, 5A and 5B which display the pre-snap configuration, radial biasing member 310 biases each jaw 300A, 300B toward central axis A-A. Furthermore, holding member 340 is located between and separates or stops jaws 300A and 300B against a biasing force of biasing member 310. In other words, holding member 340 is disposed between jaws 300A and 300B so that bias member 310 biases jaws 300A and 300B against holding member 340. FIGS. 2A & 2B also show the notch 307 in an upper portion of each of jaws 300A and 300B. In addition, as mentioned above, each notch 307 includes a bottom surface 309. A portion of holding member 340 extends below bottom surface 309 and is therefore, in the pre-snap configuration, is positioned between jaws 300A and 300B.

Furthermore, in the pre-snap configuration, longitudinal biasing member 350 forces holding member 340 downward and in contact with alignment pin 320. Specifically holding member 340 is forced by longitudinal biasing member 350 so that resilient legs 344 remain extended around alignment pin 320. Side walls 362 of upper guide 360 surround and are generally adjacent to bias member 350 and holding member 340 and so keep them aligned during any axial movement.

During rod installation, rod 50 is extended into inner space 244 until it engages lower member 343 of holding member 340. As rod 50 passes through jaws 300A, 300B, jaws 300A, 300B are kept in alignment (e.g., axial) by alignment pin 320. In other words, alignment pin permits, but limits relative axial miss alignment between jaws 300A and 300B. The user then continues to insert rod 50 by pushing holding member 340 upward in direction D away from and relative to jaws 300A, 300B and against the biasing force of longitudinal resilient member 350. Also overcome by the pushing force is the friction between holding member 340 and jaws 300A and 300B generated by bias member 310. Lower member 343 may also limit any upward movement of holding member 340 as rod 50 moves holding member 340 upward relative to jaws 300A and 300B. Resilient legs 344 which initially surround alignment pin 320 now flex outward to release alignment pin 320 and then back inward as holding member 340 is pushed away from alignment pin 320. While resilient legs 344 are flexible, they possess sufficient strength such that a significant and noticeable rod 50 force must be exerted on holding member 340 by rod 50 of a user to overcome alignment pin 320/holding member 340 locking forces. Specifically, at least a biasing force of legs 344, a frictional force between holding member 340 and jaws 300A and 300B, and a biasing force of biasing member 350 must be overcome to suddenly release alignment pin 320 from the lock of legs 344.

When holding member 340 is pushed up sufficiently so that bottom surface 342 of holding member 340 is above bottom surface 309 of notch 307, holding member 340 has cleared jaws 300A and 300B and resilient member 310 suddenly biases internal threads 302 of jaws 300A, 300B together until internal threads 302 engage external threads of rod 50 with a sudden impact. Again, alignment pin 320 minimizes or limits the possible misalignment (e.g., axial) of jaws 300A, 300B so that internal threads on both jaw 300A and jaw 300B effectively engage external jaws of rod 50. After snapping, holding member 340 is then accommodated in notch 307 as shown best in FIG. 2B.

FIGS. 2C, 6A and 6B show the configuration of jaw assembly 250 in the post-snap configuration. After holder 340 is displace from between jaws 300A, 300B, and jaws 300A and 300B snap/collapse onto rod 50, jaws 300A and 300B prevent axial removal of rod 50 from support member 210 except by rotation. FIG. 5A shows rod 50 engaging holding member 340 pre-snap and FIG. 6A shows rod 50 secured in jaws 300A, 300B post-snap. Furthermore, when rod 50 is loaded in a direction opposite direction D, inclined surface 304 of jaws 300A, 300B engages inclined surface 237 of inner space 244. The result of the interaction of these inclined surfaces is that a downward loading of rod 50 in a direction opposite D results in a force on jaws 300A, 300B toward central axis A-A. Such a radially inward force prevents jaws 300A, 300B from separating and axially releasing rod 50.

The fact that jaws 300A and 300B do not engage rod 50 until threaded rod 50 is inserted completely into the threads promotes a maximum thread engagement in the post-snap configuration. In other words, the present invention which triggers engagement only if at least a minimum predetermined rod insertion length is achieved lessens the possibility of an inadequate thread engagement during installation.

Furthermore, a sudden impact of jaws 300A and 300B on rod 50 transfers energy to and along rod 50 to a hand of an installer to indicate to the installer that jaws 300A and 300B have engaged and rod 50 has been inserted sufficiently into opening 214. Furthermore, the sudden release of legs 344 can be an indication to an installer that a minimum insertion length has been achieved.

The snap-nut assembly described above may be utilized in any anchoring system in which it is desired to axially secure a shaft such as a threaded shaft to a support structure. Therefore, the snap-nut assemblies disclosed herein may be integrated into various anchoring or connection systems including metal deck anchoring systems such as described in U.S. Pat. No. 4,007,563 to Nakagawa and which is incorporate herein by reference in its entirety.

FIG. 7A-7C show an alternate embodiment of the anchor assembly of FIGS. 1A and 1B. The anchor assembly is generally shown at 700 and is similarly to anchor assembly 100 as it also includes adjustable position locking threaded jaws. Anchor assembly 700 includes a support member 710. Support member 710 includes a flange 738 at an upper end or assembly end. Support member 710 also includes a lower end or insertion end 712 with an insertion opening 714, and an inner space 744 for receiving a jaw assembly 750. Flange 738 includes a central cover 760 that defines an upper flange end of inner space 744. Cover 760 is removable and lockable (e.g., with threads) to offer access to inner space 744 for assembly. Inner space 744 includes an inward facing inclined surface 737. Inclined surface 737 slants downward from flange 738 toward a central longitudinal axis A-A of anchor assembly 700. Jaw assembly 750 includes jaws 700A and 700B. Jaws 700A and 700B each include inner threads 702, a radially inward inclined outer surface 704, and an alignment passage 708. Jaw assembly 750 also includes an alignment pin 720, an alignment stop 740, and a biasing member 755. Biasing member 755 may be any resilient object such as a coil, leaf or wave spring that compresses to generate a continuous reactive biasing force. Biasing member 755 could also be a resilient solid member such as a piece of rubber (e.g., tube shaped). Alignment stop 740 includes a bottom surface 742, an opening or passage 745 that could be a through passage, and a sidewall 746.

When jaw assembly 750 is assembled, jaws 700A and 700B are positioned in inner space 744 such that outer surface 704 complementarily engages inclined surface 737. Alignment pin 720 passes through openings 708 in jaws 700A and 700B and through stop 740. Biasing member 755 is compressed between cover 780 and a top of each jaw 700A and 700B. The compressed biasing member 755 reacts to, forces, or urge jaws 700A and 700B longitudinally toward insertion end 712. Because the inclined surfaces 737 are slanted or inclined inward, biasing member 755 ultimately also urges jaws 700A and 700B radially inward toward central longitudinal axis A-A.

Alignment pin 720 passes through stop 740 which at least in part serves to stabilize pin 720. In addition, the arrangement of pin 720 relative to stop 740 avoids any direct contact between rod 50 and pin 720. Alignment pin 740 also passes through jaws 700A and 700B such that alignment pin 720 limits any possible axial misalignment between jaws 700A and 700B. Alignment pin 720 may also be sized in openings 708 of jaws 700A and 700B to allow jaws 700A and 700B a limited freedom to pivot during insertion of rod 50 in order to most effectively accommodate rod 50.

During installation, an installer inserts a rod 50 into insertion opening 714. Rod 50 urges jaws 700A and 700B radially toward an assembly end and axially apart against the biasing force of biasing member 755. Rod 50 is inserted into support member 710 until an end of rod 50 engages a bottom 742 of stop 740. Bias member 775 continuously biases jaws 700A, 700B toward central axis A-A until rod 50 contacts a bottom 742 of alignment stop 740. Rod 50 can then no longer be axially removed from support member 710, but can only be removed from support member 710 by thread rotation.

The present invention disclosure may include written description and drawings that describe features in one embodiment that are not disclosed in another embodiment. The present invention contemplates interchanging such features.

The invention claimed is:

1. A support member of an anchor assembly, the support member for receiving and securing a threaded shaft thereto, the anchor assembly further including a base member that is connectable with the support member, the support member comprising:

an outer housing, the outer housing being defined by a central longitudinal axis, the outer housing including an outer wall, the outer housing also including an insertion opening at a first end thereof for receiving the threaded shaft, the outer housing further including an assembly opening at a second end opposite the first end thereof, the outer wall defining an inner space, the outer housing further including a flange disposed at the second end extending radially outward from the outer wall, the flange being embedded in concrete to resist concrete pull out of the concrete by the support member, a jaw assembly disposed in the inner space, the inner space further includes a tapered surface with a lessening inner surface diameter toward the insertion opening, the jaw assembly including at least two threaded jaws the threads of which selectively engage threads of the shaft, the jaw assembly further including a first bias member for biasing the at least two thread jaws toward the longitudinal axis, a second biasing member for biasing the jaws longitudinally toward the tapered surface.

2. The support member of claim 1, wherein the first bias member is a flexible ring.

3. The support member of claim 1, wherein the second biasing member is a coil spring or leaf spring.

4. The support member of claim 1, wherein the second biasing member is a coil spring or leaf spring that is compressible along the central longitudinal axis.

5. The support member of claim 1, wherein the first biasing member surrounds the jaw assembly.

6. The support member of claim 1, wherein the second biasing member is disposed in the inner space to bias downward against the jaw assembly.

7. The support member of claim 1, wherein the outer housing further includes an upper portion and a lower portion, one of the upper and lower portions including a male thread and the other of the upper and lower portions including a female thread, the male and female threads connectable complementarily together to form the outer housing.

8. The support member of claim 7, wherein the lower portion includes a tapered seat for engagement with a complementarily tapered seat of the jaw assembly.

9. A support member of an anchor assembly, the support member for receiving and securing a threaded shaft thereto, the anchor assembly further including a base member that is connectable with the support member, the support member comprising:

an outer housing, the outer housing being defined by a central longitudinal axis, the outer housing including an outer wall, the outer housing also including an insertion opening at a first end thereof for receiving the threaded shaft, the outer housing further including an assembly opening at a second end opposite the first end thereof, the outer wall defining an inner space, the outer housing further including a flange disposed at the second end extending radially outward from the outer wall, the flange being embedded in concrete to resist concrete pull out of the concrete by the support member, a jaw assembly disposed in the inner space, the inner space further includes a tapered surface with a lessening inner surface diameter toward the insertion opening, the jaw assembly including at least two threaded jaws the threads of which selectively engage threads of the shaft, the jaw assembly further including a first bias member for biasing the at least two thread jaws toward the longitudinal axis, a holding member for preventing the bias member from moving the at least two threaded jaws toward the longitudinal axis, wherein, in a first jaw assembly configuration, the holding member prevents the at least two threaded jaws from moving toward the central longitudinal axis, a second biasing member disposed in the inner space to bias downward against the jaw assembly; and wherein, in the first configuration the threaded shaft is inserted into the connector opening, to contact the holding member to release the at least two threaded jaws to move toward the central longitudinal axis and into biased contact with the threaded shaft to define a second jaw assembly configuration.

10. The support member of claim 9, wherein an outer surface of the jaw assembly engages the tapered surface so that in the second configuration, loading the threaded shaft in the direction from the assembly opening to the connector opening urges the at least two threaded jaws toward the threaded shaft.

11. The support member of claim 9, wherein the outer housing further includes a plug for lockable engagement with the assembly opening and for containing the jaw assembly and the holding member in the inner space.

12. The support member of claim 11, wherein, in use, the threaded shaft is insertable into the connector opening and engageable with the holding member to move the holding member toward the plug and relative to the at least two threaded jaws, the plug or the outer housing capable of stopping axial movement by the at least one threaded jaw in a shaft insertion direction to release the hold of the holding member and trigger the second configuration.

13. The anchor assembly of claim 9, wherein the support member includes a rotation stop and wherein the alignment member engages the rotation stop to prevent the jaws from rotating relative to the support member.

14. The anchor assembly of claim 13, wherein the rotation stop is a slot and the alignment member is a pin and the pin is received in the slot.

* * * * *